(12) United States Patent
Horiguchi

(10) Patent No.: US 9,798,069 B2
(45) Date of Patent: Oct. 24, 2017

(54) BACKLIGHT DEVICE AND DISPLAY APPARATUS

(71) Applicant: Sakai Display Products Corporation, Sakai-shi, Osaka (JP)

(72) Inventor: Yuki Horiguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/026,458

(22) PCT Filed: Nov. 26, 2013

(86) PCT No.: PCT/JP2013/081746
§ 371 (c)(1),
(2) Date: Mar. 31, 2016

(87) PCT Pub. No.: WO2015/079485
PCT Pub. Date: Jun. 4, 2015

(65) Prior Publication Data
US 2016/0245982 A1     Aug. 25, 2016

(51) Int. Cl.
*F21V 8/00*     (2006.01)
*G02F 1/1335*     (2006.01)

(52) U.S. Cl.
CPC ......... *G02B 6/0051* (2013.01); *G02B 6/0053* (2013.01); *G02B 6/0056* (2013.01); *G02B 6/0091* (2013.01); *G02F 1/133615* (2013.01)

(58) Field of Classification Search
CPC .. G02B 6/0088; G02B 6/0011; G02B 6/0068; G02B 6/0073; G02B 6/009;
(Continued)

(56) References Cited

U.S. PATENT DOCUMENTS 6,580,476 B2 *   6/2003   Hasegawa ......... G02F 1/133308
                                                        349/58
6,600,526 B2 *   7/2003   Yano ................... G02B 6/0031
                                                        349/65
(Continued)

FOREIGN PATENT DOCUMENTS

JP        2005243572 A  *  9/2005
JP        2007-279593 A    10/2007
(Continued)

*Primary Examiner* — Hargobind S Sawhney
(74) *Attorney, Agent, or Firm* — Rudy J. Ng; Bret E. Field; Bozicevic, Field & Francis LLP

(57) ABSTRACT

A backlight device comprising a light source, a light guide plate with a side surface receiving light entering from the light source and with one surface emitting light, a frame body surrounding the light source and an edge of the light guide plate, and an optical sheet placed at a region facing the one surface, wherein the frame body has a first covering part covering, at a side proximal to the light source, an edge of the one surface, the optical sheet is placed on the first covering part at the side proximal to the light source, and is placed at least partly on the one surface at a side where the light source is not provided, a support body for support of the light guide plate is arranged between the light guide plate and a bottom plate of the frame body, and the first covering part holds the light guide plate between the first covering part and the support body.

6 Claims, 5 Drawing Sheets

(58) Field of Classification Search
CPC .. G02B 6/0051; G02B 6/0056; G02B 6/0053; G02B 6/0091; G02B 6/0055; G02F 1/133553; G02F 1/133615; G02F 1/133308; G02F 1/133314; G02F 1/133317; G02F 1/133332
See application file for complete search history.

(56) References Cited

U.S. PATENT DOCUMENTS

| | | | |
|---|---|---|---|
| 6,891,580 B2* | 5/2005 | Jang | G02B 6/0086 349/110 |
| 2005/0152157 A1* | 7/2005 | Nomura | G02B 6/0055 362/609 |
| 2012/0081925 A1 | 4/2012 | Cho et al. | |

FOREIGN PATENT DOCUMENTS

| | | | |
|---|---|---|---|
| JP | 2012-78832 A | | 4/2012 |
| JP | 2012-164507 A | | 8/2012 |
| JP | 2013045559 A | * | 3/2013 |
| WO | WO2012169441 A1 | | 12/2012 |

* cited by examiner

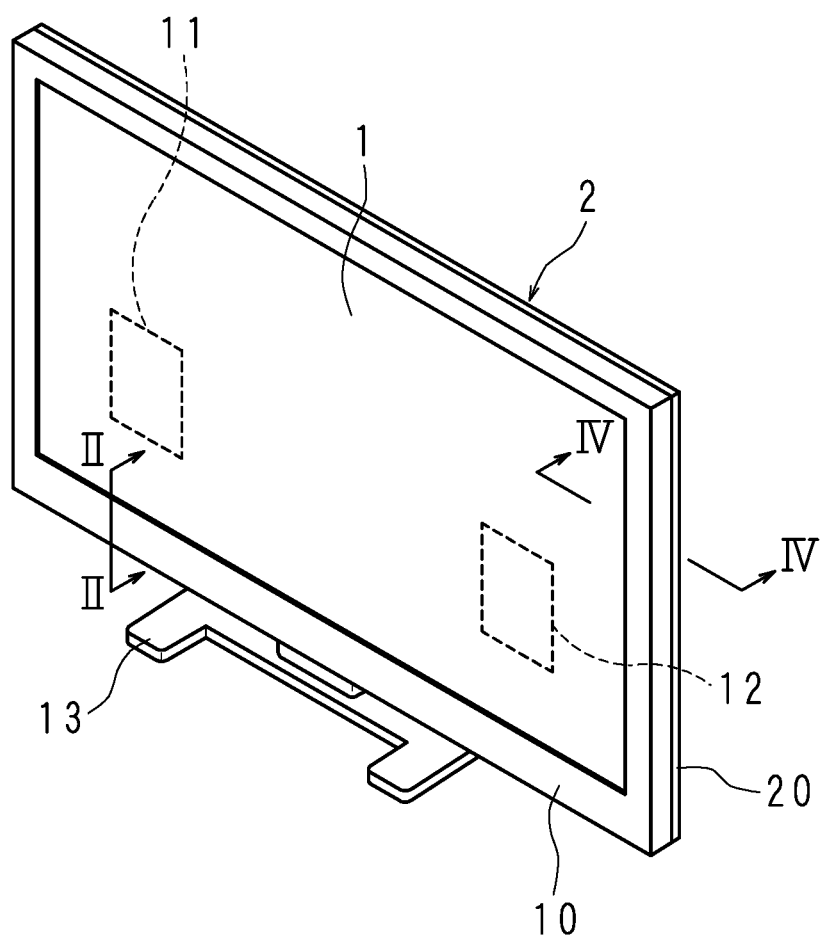
F I G. 1

F I G. 3
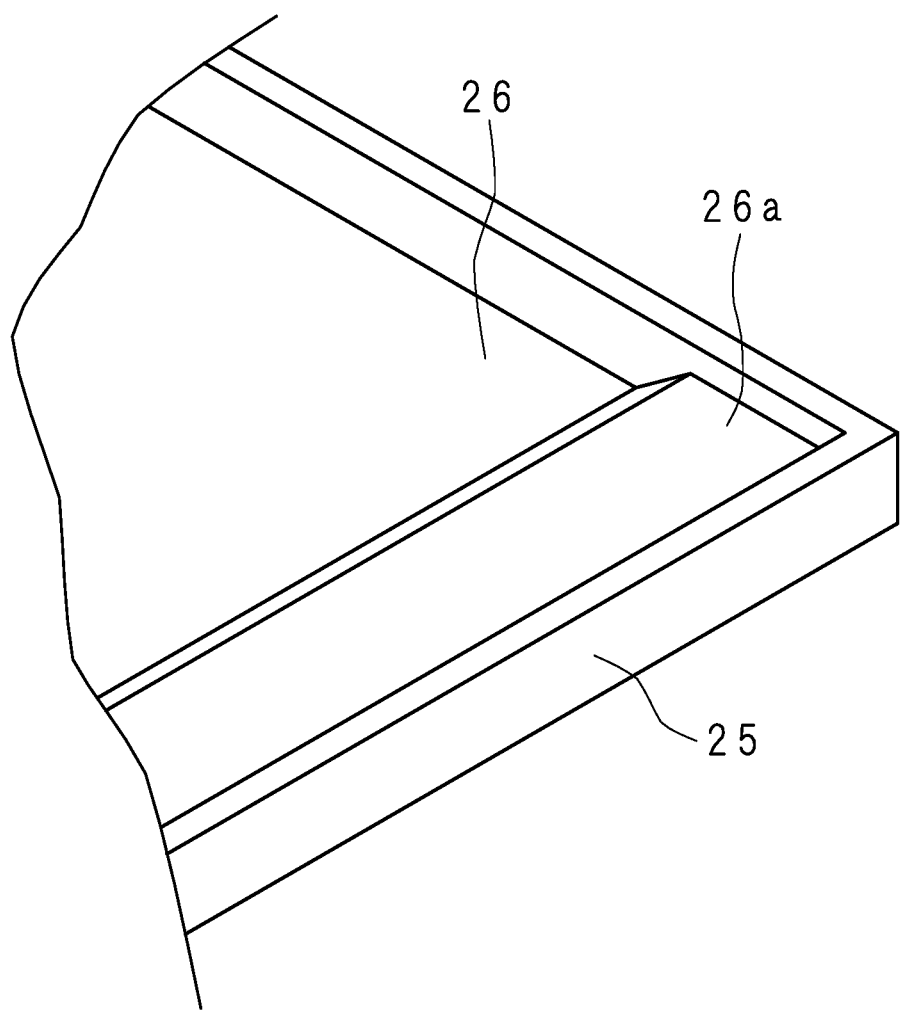

BACKLIGHT DEVICE AND DISPLAY APPARATUS

CROSS-REFERENCE TO RELATED APPLICATIONS

This application is the national phase of PCT International Application No. PCT/JP2013/081746 which has an International filing date of Nov. 26, 2013 and designated the United States of America.

BACKGROUND

Field

The present invention relates to a backlight device for irradiating a display panel that displays an image and to a display apparatus comprising the backlight device.

Background Art

In recent years, a display apparatus comprising a liquid crystal panel as an image display part is widespread. Such a display apparatus is so configured that a backlight device is placed at the back side of the liquid crystal panel and the light emitted from the backlight device is modulated by and transmitted through the liquid crystal panel to display an image on the front surface of the liquid crystal panel.

A backlight device is so configured that a light guide plate and a light source are accommodated inside a box-shaped backlight chassis with an opening at its one side. The light guide plate is placed to cover substantially the entire bottom plate of the backlight chassis. The light source is, for example, a light emitting diode (LED) and is fixed to a side plate of the backlight chassis to face a side surface of the light guide plate. A frame body is placed at the open side of the backlight chassis to cover the edges of the open side and the edges of the light guide plate. An optical sheet is held on the frame body at the side opposite to the light guide plate. A display apparatus is so configured that a liquid crystal panel, which is supported by the frame body, is arranged to face the optical sheet. In the display apparatus configured in such a manner, the light emitted from the light source enters the light guide plate at the side surface thereof and progresses through the light guide plate, while being diffused, to be emitted from one surface of the light guide plate through the optical sheet, for irradiating the liquid crystal panel.

In recent years, as the bezel of a display apparatus is being slimmed, the display apparatus configured as described above is making the interval closer between the inner edges of the frame body covering the edges of the light guide plate and the display area of the screen of the liquid crystal panel. Because the frame body hinders light transmission, shadows of the frame body is formed at the edge part of the display area, which makes the edge part dark. The problem here is that the display quality of an image is deteriorated in this way.

Japanese Patent Application Laid-open No. 2012-164507 suggests a display apparatus and a backlight device used in the display apparatus, for the solution of the problem described above. The display apparatus described in Patent Document 1 has a positioning hole formed in an optical sheet covering the light emitting surface of the light guide plate and a positioning pin formed in the light guide plate for insertion into the positioning hole. The optical sheet is arranged on the light guide plate and positioned by the insertion of the positioning pin into the positioning hole.

Because the optical sheet is placed directly on the light guide plate, the frame body does not have to include the positioning function for the optical sheet, which enables the frame to be slimmed and thus avoids the dark part.

SUMMARY

However, in the backlight device described in Japanese Patent Application Laid-open No. 2012-164507, there is a possibility that the light emitted from the light source enters directly an end surface of the optical sheet to be emitted therefrom without passing through the light guide plate or without sufficient diffusion inside the light guide plate. The light emitted in such a manner is directed locally to the edge part of the display area of liquid crystal panel, which makes the illuminated part bright and thus makes the brightness distribution of the display area non-uniform. Therefore, the display quality of the liquid crystal panel is deteriorated.

The present invention is made in consideration of the above-described circumstances, and the object thereof is to provide a backlight device capable of reducing the adverse effect for the display quality caused by non-uniformity of the irradiation light and a display apparatus comprising the backlight device.

A backlight device according to one embodiment of the present invention includes a light source, a light guide plate with a side surface receiving light entering from the light source and with one surface emitting light, a frame body surrounding the light source and an edge of the light guide plate, and an optical sheet placed at a region facing the one surface, wherein the frame body has a first covering part covering, at a side proximal to the light source, an edge of the one surface, and the optical sheet is placed on the first covering part at the side proximal to the light source and is placed at least partly on the one surface at a side where the light source is not provided.

In the backlight device according to the embodiment of the present invention, the light source may be placed to face one side surface of the light guide plate, and the optical sheet may be placed on the one surface at a side opposite to the side proximal to the light source.

In the backlight device according to the embodiment of the present invention, the light source may be placed to face one side surface of the light guide plate, the frame body may has a second covering part covering at the side opposite to the side proximal to the light source an edge of the one surface, and the optical sheet may be placed on the second covering part at the side opposite to the side proximal to the light source.

A display apparatus according to one embodiment of the present invention, is characterized by including a display panel for displaying an image, and the backlight device described above for emitting light to the display panel.

According to the embodiment of the present invention, the first covering part that covers the edges at the side proximal to the light source of the one surface of the light guide plate prevents the light emitted from the light source from being emitted from the light guide plate without sufficient diffusion inside the light guide plate. In addition, by placing the optical sheet on the first covering part at the side proximal to the light source and placing at least some part of the optical sheet on the light guide plate at a side where the light source is not provided, the light emitted from the light source is prevented from entering an end surface of the optical sheet to be emitted therefrom without passing through the light guide plate, and the shadow formed by the structure such as the first covering part is diminished. Therefore, the backlight device according to the embodiment of the present invention can reduce the adverse effect to the display quality caused by the non-uniformity of the irradiation light.

In addition, the display apparatus employing such a backlight device as a lighting device can reduce the influence of the non-uniform brightness distribution of the display screen and thereby improve the display quality.

The above and further objects and features of the invention will more fully be apparent from the following detailed description with accompanying drawings.

BRIEF DESCRIPTION OF DRAWINGS

FIG. 1 is a schematic perspective view illustrating the exterior of a display apparatus according to Embodiment 1;

FIG. 3 is a schematic perspective view illustrating the arrangement of an optical sheet in the vicinity of a side proximal to the light source of a backlight device according to Embodiment 1;

DESCRIPTION OF EMBODIMENTS

Figure 2:
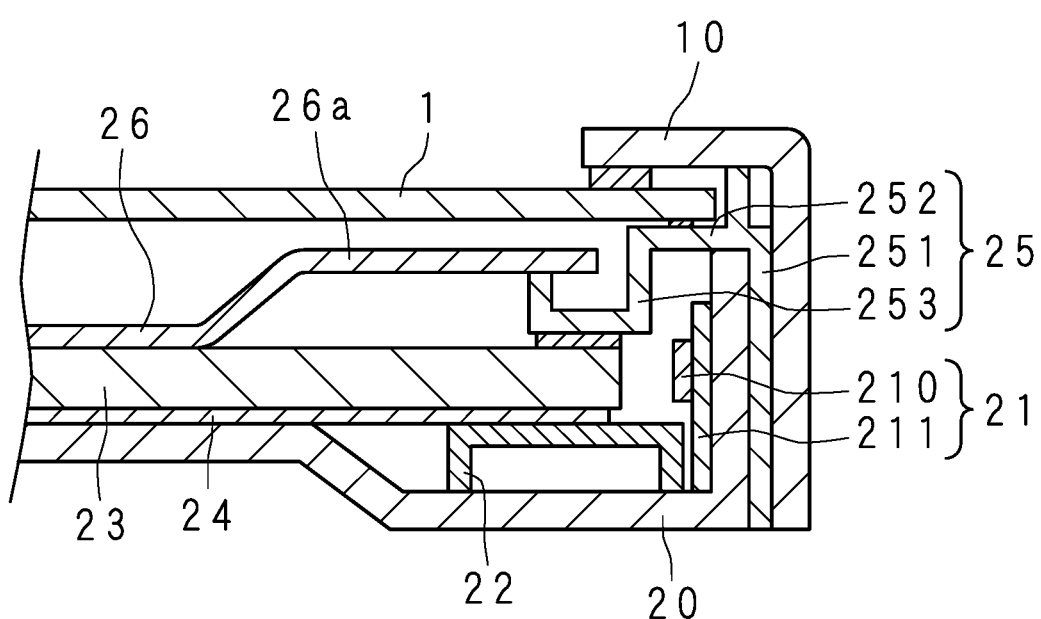
FIG. 2 is a cross-sectional view along the line II-II in FIG. 1.

The present invention will be described in detail below with reference to the drawings illustrating the embodiments thereof.

(Embodiment 1)

FIG. 1 is a schematic perspective view illustrating the exterior of a display apparatus according to Embodiment 1. The illustrated display apparatus comprises a liquid crystal panel (display panel) 1 with a rectangular plate shape for displaying an image and a backlight device 2 for irradiating the liquid crystal panel 1 with light.

A front cabinet 10 with a rectangular frame shape is assembled onto the liquid crystal panel 1 to frame the edges of the image displaying surface of the liquid crystal panel 1 for an appropriate width. FIG. 1 illustrates only the image displaying surface of the liquid crystal panel 1 which is exposed inside the frame of the front cabinet 10. The back side of the liquid crystal panel 1 is covered by a backlight chassis 20 that is a component of the outer casing of the backlight device 2. The backlight chassis 20 is assembled onto the back side of the liquid crystal panel 1 as described below.

The display apparatus illustrated in FIG. 1 is configured as a television receiver that comprises a receiver 11 and a signal processor 12 both of which are assembled onto the back surface of the backlight chassis 20. The receiver 11 is connected to an antenna (not depicted) to receive a television broadcast via the antenna. The signal processor 12 decodes the data according to the television broadcast received by the receiver 11 and separates image data from the decoded data to output the separated image data. The liquid crystal panel 1 displays an image based on the image data output by the signal processor 12 on the image displaying surface.

The display apparatus further comprises a stand 13. The stand 13 has a foot part that is formed to spread in an H shape substantially perpendicular to a leg protruding from the middle of one longer side of the backlight chassis 20 and connected to the tip of the leg. The display apparatus is supported by the stand 13 on the placement surface and is used while keeping the image displaying surface of the liquid crystal panel 1 in a vertical position. In the following description, one side of the image displaying surface of the liquid crystal panel 1 is referred to as the front and the other side is referred to as the rear. In addition, the upper and the lower used in the following description correspond to the upper and the lower directions in the state where display device is used as described above, respectively. Likewise, the left and the right correspond to the left and the right seen from the front side while in use.

FIG. 2 is a cross-sectional view along the line II-II in FIG. 1. The backlight device 2 is so configured that the backlight chassis 20 that has a shallow box shape with one entire side thereof opened accommodates, for example, a light source part 21, a light guide plate 23 and so forth.

The light source part 21 has a substrate 211 with a strip shape and a light source 210 mounted on the substrate 211. The light source 210 is, for example, a plurality of light emitting diodes, which are arranged side by side along the longitudinal direction of the substrate 211. The light source part 21 is fixed to a lower side plate of the backlight chassis 20 to orient inward the surface of the substrate 211 on which the light source 210 is mounted. The light source part 21 may be a cold cathode fluorescent lamp (CCFL), an external electrode fluorescent lamp (EEFL), a hot cathode fluorescent lamp (HCFL), etc.

The light guide plate 23 is made of synthetic resin, such as acrylic resin or polycarbonate resin, with high transparency and is formed in a rectangular plate shape. The light guide plate 23 is mounted on the bottom plate of the backlight chassis 20 in the state where one surface of the light guide plate 23 faces the opening of the backlight chassis 20. In addition, a support body 22 for support of the light guide plate 23 is arranged between the bottom plate of the backlight chassis 20 and the light guide plate 23 at a side proximal to the light source 210 of the backlight chassis 20.

The reflection sheet 24 is a sheet made of synthetic resin with high reflectivity. The reflection sheet 24 is adhered to the other surface of the light guide plate 23 which is opposite to the one surface.

The frame body 25 is a rectangular frame member made of, for example, resin and encloses the edges of the light guide plate 23 and the light source 210. The frame body 25 has a surrounding plate 251 that is fitted to the exterior of the side walls of the backlight chassis 20 and a support plate 252 that is extendingly provided perpendicularly from the inner surface of the surrounding plate 251. In addition, the frame body 25 has a pressing plate (first covering part) 253 integrally protruding from the support plate 252 at the side proximal to the light source 210 toward the light guide plate 23. The pressing plate 253 abuts on the edges of the one surface of the light guide plate 23 via a cushion and holds the light guide plate 23 between the pressing plate 253 and the support body 22. In addition, the pressing plate 253 also serves as a light blocking structure which covers the light source 210 together with the support plate 252 to block the light emitted from the light source 210 toward the front side of the display apparatus.

An optical sheet 26 is fabricated by laminating, for example, a diffusion sheet, a prism sheet and a polarizing sheet. The optical sheet 26 has a rectangular plate shape and is placed on the light guide plate 23 to cover substantially the entire surface of the light guide plate 23. The optical sheet 26 has, at the side proximal to the light source 210, a brim 26a rising slantingly toward the front side. At the side proximal to the light source 210, the pressing plate 253 of the frame body 25 functions also as a holding part for the optical sheet 26, as the brim 26a of the optical sheet 26 is placed on the pressing plate 253. At the side where the light source 210 is not provided, the optical sheet 26 is arranged to be laminated onto the one surface of the light guide plate 23. FIG. 3 is a schematic perspective view illustrating the arrangement of the optical sheet 26 in the vicinity of a side proximal to the light source 210 of the backlight device 2 according to Embodiment 1. FIG. 3 illustrates only main parts of the frame body 25, for convenience of explanation. As illustrated in FIG. 3, the brim 26a is continuously formed along the lengty direction of the optical sheet 26.

In the backlight device 2 configured as described above, the light emitted from the light source 210 enters the light guide plate 23 through the side surface thereof and progresses inside the light guide plate 23, while undergoing repeated total reflections on the reflection sheet 24 and partial reflections on the one surface of the light guide plate 23, to be uniformly emitted from the entire one surface of the light guide plate 23 toward the optical sheet 26.

The liquid crystal panel 1 is arranged on the support plate 252 of the frame body 25, with the back side thereof facing the optical sheet 26. The front cabinet 10 covers the edges of the front side of the liquid crystal panel 1 and is fitted to the exterior of the surrounding plate 251 of the frame body 25, so as to hold the liquid crystal panel 1 between the front cabinet 10 and the support plate 252. The display apparatus is configured as described above. In the display apparatus as described above, the foresaid light emitted from the light guide plate 23 passes through the optical sheet 26 to be directed to the back surface of the liquid crystal panel 1 for allowing the liquid crystal panel 1 to display an image.

Figure 4:
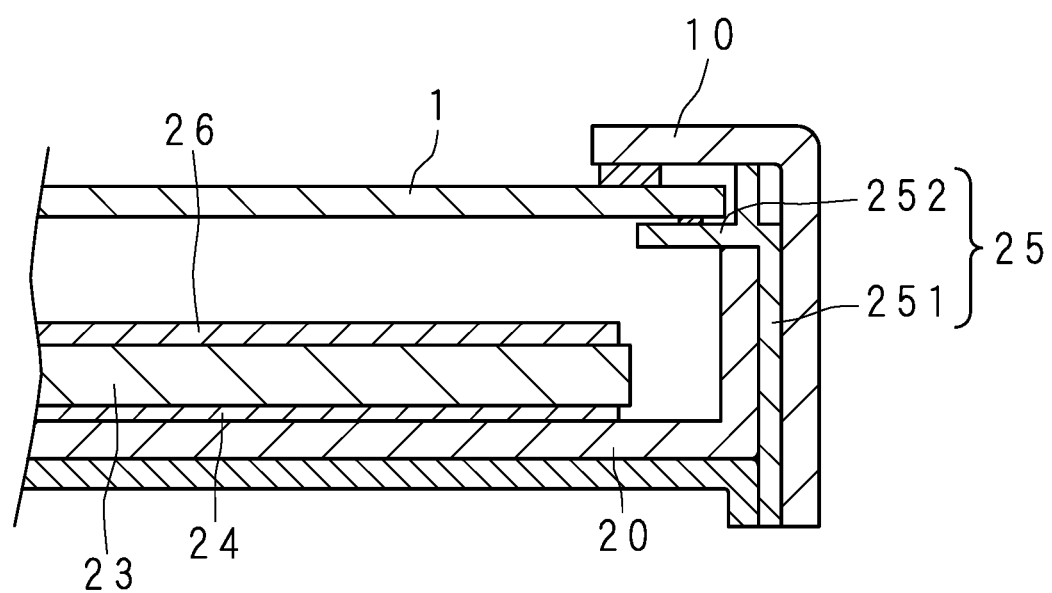
FIG. 4 is a cross-sectional view along the line IV-IV in FIG. 1.

FIG. 4 is a cross-sectional view along the line IV-IV in FIG. 1. FIG. 4 illustrates the cross section of the right side where the light source 210 is not provided. As illustrated in FIG. 4, the frame body 25 has the surrounding plate 251 that is fitted to the exterior of the side walls of the backlight chassis 20 and the support plate 252 that extends perpendicularly from the inner surface of the surrounding plate 251. The support plate 252 is not provided with the continuously-formed pressing part 253. In addition, the optical sheet 26 does not have the brim 26a and is arranged to cover the light guide plate 23 to its end.

While only the right side of the backlight device 2 is illustrated and described above with reference to FIG. 4, the similar structure is provided at the left and upper sides of the backlight device 2.

In the backlight device 2 configured as described above, because the pressing plate 253 covers the edges at the side proximal to the light source 210 of the one surface of the light guide plate 23, the light emitted from the light source 210 to the light guide plate 23 is sufficiently diffused before being emitted from the light guide plate 23. In addition, because the brim 26a formed at the side proximal to the light source 210 of the optical sheet 26 is placed on the pressing plate 253, the light emitted from the light source 210 is prevented from entering the end surface of the optical sheet 26 and being emitted therefrom without passing through the light guide plate 23. Therefore, the bright part is avoided at the side proximal to the light source 210. In addition, at the side where the light source 210 is not provided, because the frame body 25 excludes the pressing plate 253 and the optical sheet 26 is placed on the light guide plate 23, at this side, a dark part caused by the shadow of the pressing part 253 is avoided at edge part of the display area of liquid crystal panel 1. Therefore, the quality of the image displayed on the liquid crystal panel 1 can be improved.

(Embodiment 2)

Figure 5:
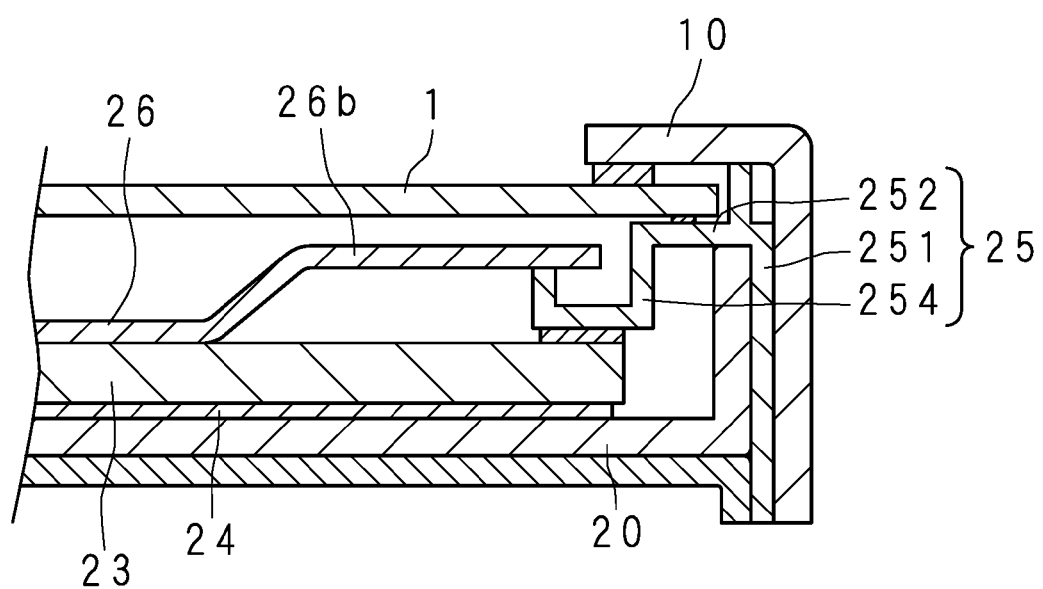
FIG. 5 is a cross-sectional view illustrating main components of a backlight device according to Embodiment 2.

FIG. 5 is a cross-sectional view illustrating main components of a backlight device 2 according to Embodiment 2. FIG. 5 illustrates the structure at the side opposite to the side proximal to the light source 210 of the backlight device 2. The components and functions except for ones described specifically below are similar to those in Embodiment 1, and thus the description thereof will not be repeated for simplicity.

As illustrated in FIG. 5, the frame body 25 has a pressing plate (second covering part) 254 covering the edges of the one surface of the light guide plate 23 at the side opposite to the side proximal to the light source 210. The pressing plate 254 is provided continuingly to the support plate 252, similarly to the pressing plate (first covering part) 253 at the side proximal to the light source 210. The optical sheet 26 has a brim 26b that is formed at the side opposite to the side proximal to the light source 210, similarly to the brim 26a formed at the side proximal to the light source 210. The pressing part 254 functions also as a holding part for the optical sheet 26. The brim 26b of the optical sheet 26 is placed also on the pressing plate 254 at the side opposite to the side proximal to the light source 210, by being held by the pressing plate 254, similarly to the side proximal to the light source 210.

In the backlight device 2 configured as described above, because the brim 26b is formed at the side opposite to the side proximal to the light source 210 of the optical sheet 26 and is placed on the pressing plate 254, the optical sheet 26 is securely held. In addition, because the light leaking from the end of the light guide plate 23 is blocked by the pressing plate 254 and the brim 26b of the optical sheet 26, the bright part can be avoided at that area.

While, in the embodiments described above, the configuration in which one light source part 21 is arranged along the lower side surface of the light guide plate 23 is described, the backlight device 2 may comprise two light source parts 21. In such an embodiment, the two light source parts 21 may be arranged to face the right and left side surfaces of the light guide plate 23, or to face the upper and lower side surfaces of the light guide plate 23.

In addition, in the embodiments described above, the frame body 25 may be fabricated in one body, or the four sides of the frame body 25 may be fabricated in separate bodies and then be connected to each other at their ends.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

The invention claimed is:

1. A backlight device, comprising:
   an outer casing having a shape of a box with a bottom plate, a side plate surrounding the bottom plate, and an opening at one side facing the bottom plate;
   a light guide plate with a side surface receiving light, a front surface emitting light, and a rear surface facing and covering the bottom plate of the outer casing;
   a light source fixed to the side plate of the outer casing to face a side surface of the light guide plate;
   a frame body covering the edges of the opening of the outer casing and the edges of the light guide plate, wherein the frame body comprises the following(i)

through (iii) so as to enclose the light source and the edges of the light guide plate:
  (i) a surrounding plate whose inner surface is fitted to an outer surface of the side plated of the outer casing;
  (ii) a support plate extending inwardly from the inner surface of the surrounding plate; and
  (iii) a first covering part integrally protruding, at a side proximal to the light source, from the support plate of the frame body toward the light guide plate; and
an optical sheet facing the front surface of the light guide plate, wherein
the optical sheet is placed on the first covering part at the region proximal to the light source, and is placed at least partly on the front surface of the light guide plate at a region far from the light source, such that a brim of the optical sheet rising slantingly toward the region proximal to the light source from the region far from the light source is formed,
a support body for support of the light guide plate is arranged, at the region proximal to the light source, between the light guide plate and a bottom plate of the outer casing, and
the first covering part holds the light guide plate between the first covering part and the support body.

2. The backlight device according to claim 1, wherein the light source is placed to face one side surface of the light guide plate, and
the optical sheet is placed on the front surface of the light guide plate at the region far from the light source.

3. The backlight device according to claim 1, wherein the light source is placed to face one side surface of the light guide plate,
the frame body has a second covering part covering, at the region far from the light source, an edge of the front surface of the light guide plate, and
the optical sheet is placed on the second covering part at the region far from the light source.

4. The backlight device according to claim 3, wherein the optical sheet is placed at least partly on the front surface of the light guide plate at the region far from the light source, such that a second brim of the optical sheet rising slantingly toward the edge of the front surface of the light guide plated is formed.

5. A display apparatus, comprising:
a display panel for displaying an image, and
the backlight device according to claim 1 for emitting light to the display panel.

6. The backlight device according to claim 1 wherein
the first covering part covers the light source together with the support plate to block the light emitted from the light source toward the front side of the backlight device.

* * * * *